(12) United States Patent
Uematsu et al.

(10) Patent No.: US 11,479,261 B2
(45) Date of Patent: Oct. 25, 2022

(54) ABNORMALITY DETECTION DEVICE

(71) Applicant: HONDA MOTOR CO., LTD., Tokyo (JP)

(72) Inventors: Hideki Uematsu, Tokyo (JP); Yuki Onozawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 17/195,749

(22) Filed: Mar. 9, 2021

(65) Prior Publication Data
US 2021/0339760 A1 Nov. 4, 2021

(30) Foreign Application Priority Data

Apr. 30, 2020 (JP) .............................. JP2020-080654

(51) Int. Cl.
*B60W 50/02* (2012.01)
*B60W 50/04* (2006.01)

(52) U.S. Cl.
CPC ...... *B60W 50/0205* (2013.01); *B60W 50/045* (2013.01); *B60W 2050/021* (2013.01); *B60W 2050/0215* (2013.01); *B60W 2300/36* (2013.01); *B60W 2510/0609* (2013.01)

(58) Field of Classification Search
CPC ............................................... B60W 50/0205
See application file for complete search history.

(56) References Cited

U.S. PATENT DOCUMENTS

| 10,012,167 | B2 | 7/2018 | Hiramoto et al. | |
|---|---|---|---|---|
| 2003/0195682 | A1* | 10/2003 | Lee | G01L 27/007 701/30.9 |
| 2015/0096533 | A1* | 4/2015 | Hiramoto | F02D 41/0002 123/403 |

FOREIGN PATENT DOCUMENTS

| CA | 2370983 | C | * | 1/2007 | ......... F02D 41/0055 |
|---|---|---|---|---|---|
| DE | 102014219926 | A1 | * | 4/2015 | ............ F02D 11/106 |
| DE | 102018118382 | A1 | * | 1/2019 | ............ B60W 10/06 |
| JP | H02245444 | A | | 10/1990 | |
| JP | 2000247223 | A | * | 9/2000 | |
| JP | 2003120403 | A | * | 4/2003 | ............ F02B 61/045 |
| JP | 2004100494 | A | * | 4/2004 | ........... F02D 41/222 |
| JP | 2004108204 | A | * | 4/2004 | |
| JP | 2004245108 | A | * | 9/2004 | .......... F02D 35/027 |
| JP | 2005009448 | A | * | 1/2005 | |
| JP | 2005113809 | A | * | 4/2005 | |
| JP | 3788290 | B2 | * | 6/2006 | ......... F02D 41/2451 |

(Continued)

OTHER PUBLICATIONS

Japanese Office Action for Japanese Patent Application No. 2020-080654 dated Nov. 29, 2021 (partially translated).

*Primary Examiner* — Shelley Chen
(74) *Attorney, Agent, or Firm* — Thomas | Horstemeyer, LLP

(57) ABSTRACT

An abnormality detection device includes: an intake pressure sensor configured to detect an intake pressure of an internal combustion engine; an opening sensor configured to detect a throttle opening of the internal combustion engine; and a determination unit configured to determine, based on detection results of the intake pressure sensor and the opening sensor, whether the intake pressure sensor is abnormal. The determination unit determines, based on a result of intake pressure comparison between different throttle openings, whether the intake pressure sensor is abnormal.

5 Claims, 9 Drawing Sheets

(56) References Cited

FOREIGN PATENT DOCUMENTS

| JP | 3867189 | B2 | * | 1/2007 | |
|---|---|---|---|---|---|
| JP | 3900064 | B2 | * | 4/2007 | ............ F02D 41/18 |
| JP | 3990709 | B2 | * | 10/2007 | ........... F02D 31/005 |
| JP | 4306139 | B2 | * | 7/2009 | ........... F02D 41/062 |
| JP | 4368053 | B2 | * | 11/2009 | ........... F02D 41/182 |
| JP | 2015092072 | A | * | 5/2015 | ............ F02D 11/106 |
| JP | 2015092072 | A | | 5/2015 | |
| JP | 5987877 | B2 | * | 9/2016 | ............ F02D 11/106 |
| JP | 2016-211375 | A | | 12/2016 | |
| JP | 2016211375 | A | * | 12/2016 | |
| JP | 6725087 | B1 | * | 7/2020 | ............. F01M 13/00 |

* cited by examiner

ABNORMALITY DETECTION DEVICE

CROSS-REFERENCE TO RELATED APPLICATION(S)

This application claims priority to and the benefit of Japanese Patent Application No. 2020-080654 filed on Apr. 30, 2020, the entire disclosure of which is incorporated herein by reference.

BACKGROUND OF THE INVENTION

Field of the Invention

The present invention relates to an abnormality detection technique for an intake pressure sensor provided in an internal combustion engine.

Description of the Related Art

A technique of detecting the intake pressure of an internal combustion engine by an intake pressure sensor is known. The detection result of the intake pressure sensor is used for operation control of the internal combustion engine. A failure of the intake pressure sensor influences the operation control. For this reason, there is proposed a technique of detecting an abnormality of the intake pressure sensor. Japanese Patent Laid-Open No. 2016-211375 discloses a technique of determining, based on the pulsation of the intake pressure detected by an intake pressure sensor, whether an abnormality has occurred.

In a region where the throttle opening is close to a full close position, or in a region where the throttle opening is close to a full open position, the width of the pulsation of the intake pressure is small. Hence, if only the pulsation is used as a reference, a detection error may occur when determining whether an abnormality has occurred in the intake pressure sensor.

SUMMARY OF THE INVENTION

It is an object of the present invention to improve the accuracy of abnormality detection for an intake pressure sensor.

According to an aspect of the present invention, there is provided an abnormality detection device comprising: an intake pressure sensor configured to detect an intake pressure of an internal combustion engine; an opening sensor configured to detect a throttle opening of the internal combustion engine; and a determination unit configured to determine, based on detection results of the intake pressure sensor and the opening sensor, whether the intake pressure sensor is abnormal, wherein the determination unit determines, based on a result of intake pressure comparison between different throttle openings, whether the intake pressure sensor is abnormal.

Further features of the present invention will become apparent from the following description of exemplary embodiments (with reference to the attached drawings).

DESCRIPTION OF THE EMBODIMENTS

Figure 1:
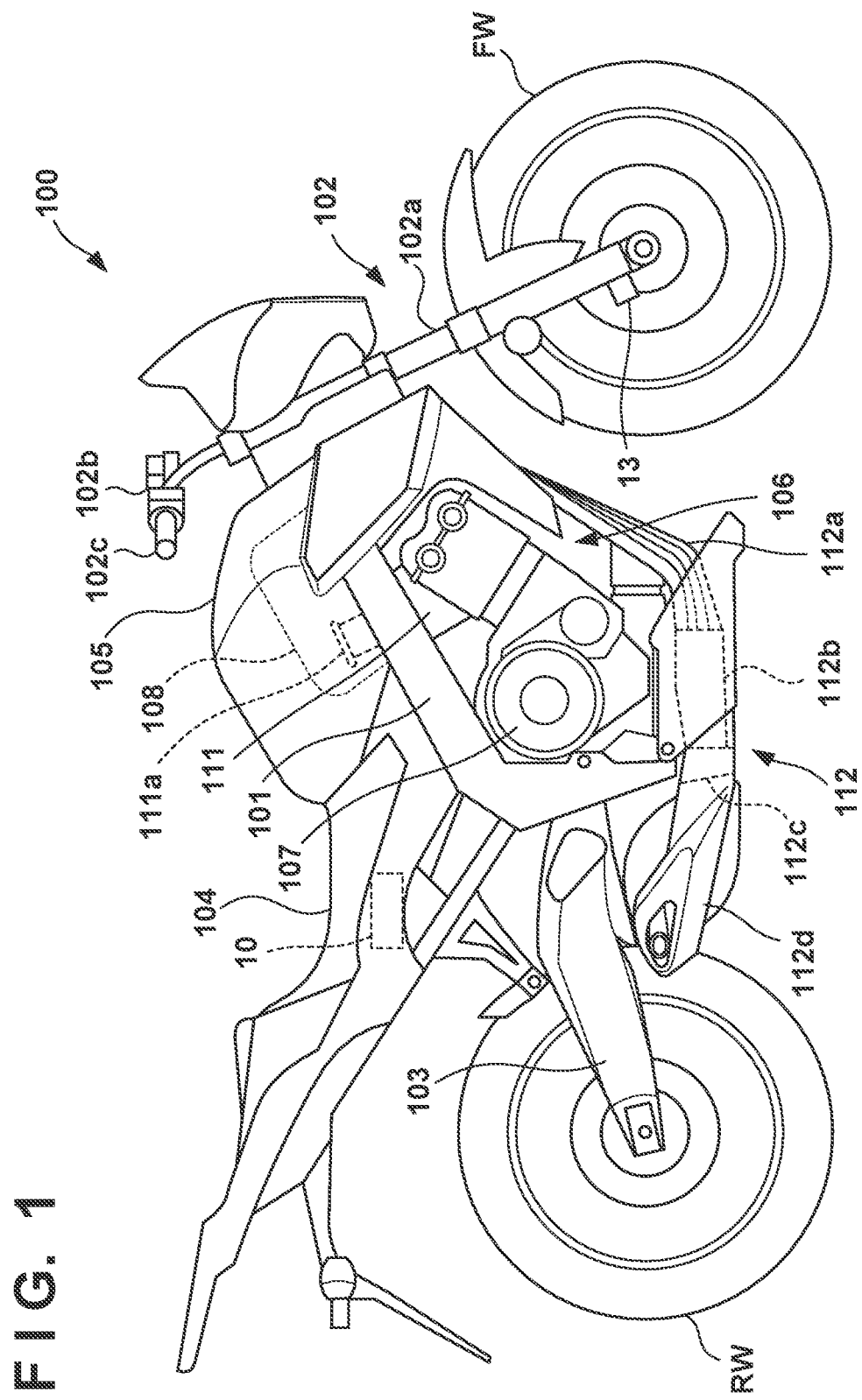
FIG. 1 is a side view of a vehicle as an application example of a control apparatus according to the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Arrangement of Vehicle>

FIG. 1 shows an example of a vehicle to which a control apparatus according to the present invention can be applied and, more particularly, shows a side view (right side view) of a straddle type vehicle 100. As the vehicle 100 according to this embodiment, a motorcycle including a front wheel FW and a rear wheel RW will be exemplified. However, the present invention can also be applied to a vehicle of another type.

The vehicle 100 includes a vehicle body frame 101 that forms the skeleton of the vehicle. A front wheel steering portion 102 is supported at the front end of the vehicle body frame 101, and a swing arm 103 is swingably supported at the rear end. The front wheel steering portion 102 includes a pair of left and right front forks 102a that support the front wheel FW, and a steering handle 102b attached to the upper portions of the pair of front forks 102a. An accelerator grip 102c that accepts an acceleration operation of a rider is provided at the right end portion of the steering handle 102b. The front end of the swing arm 103 is swingably supported by the vehicle body frame 101, and the rear wheel RW is supported at the rear end of the swing arm 103.

In a region between the front wheel FW and the rear wheel RW, an internal combustion engine 106 and a transmission 107 are supported on the vehicle body frame 101. The internal combustion engine 106 is a 4-stroke/DOHC/water-cooled engine with parallel four cylinders, and includes a crank case, a cylinder block, and a cylinder head. The internal combustion engine 106 takes in air via an intake passage 111. An exhaust gas after combustion is discharged from an exhaust passage 112. The exhaust passage 112 includes an exhaust pipe 112a connected to an exhaust port in correspondence with each cylinder, a collecting portion 112b that causes the exhaust pipes 112a to merge, a three-way catalyst 112c, and a muffler 112d. The output of the internal combustion engine 106 is transmitted to the rear wheel RW via the transmission 107 and a chain transmission mechanism (not shown).

A fuel tank 105 is arranged above the internal combustion engine 106, and a seat 104 on which the rider sits is arranged on the rear side of the fuel tank 105. An air cleaner box 108 that introduces outside air is arranged inside the fuel tank 105. An air cleaner (not shown) and an air funnel 111a that constitutes the intake passage 111 are arranged in the internal space of the air cleaner box 108. The air filtered by the air cleaner can be introduced into the internal combustion engine 106 via the air funnel 111a. On the lower side of the seat 104, a control unit 10 is supported by the vehicle body frame 101.

<Control Apparatus>

Figure 2:
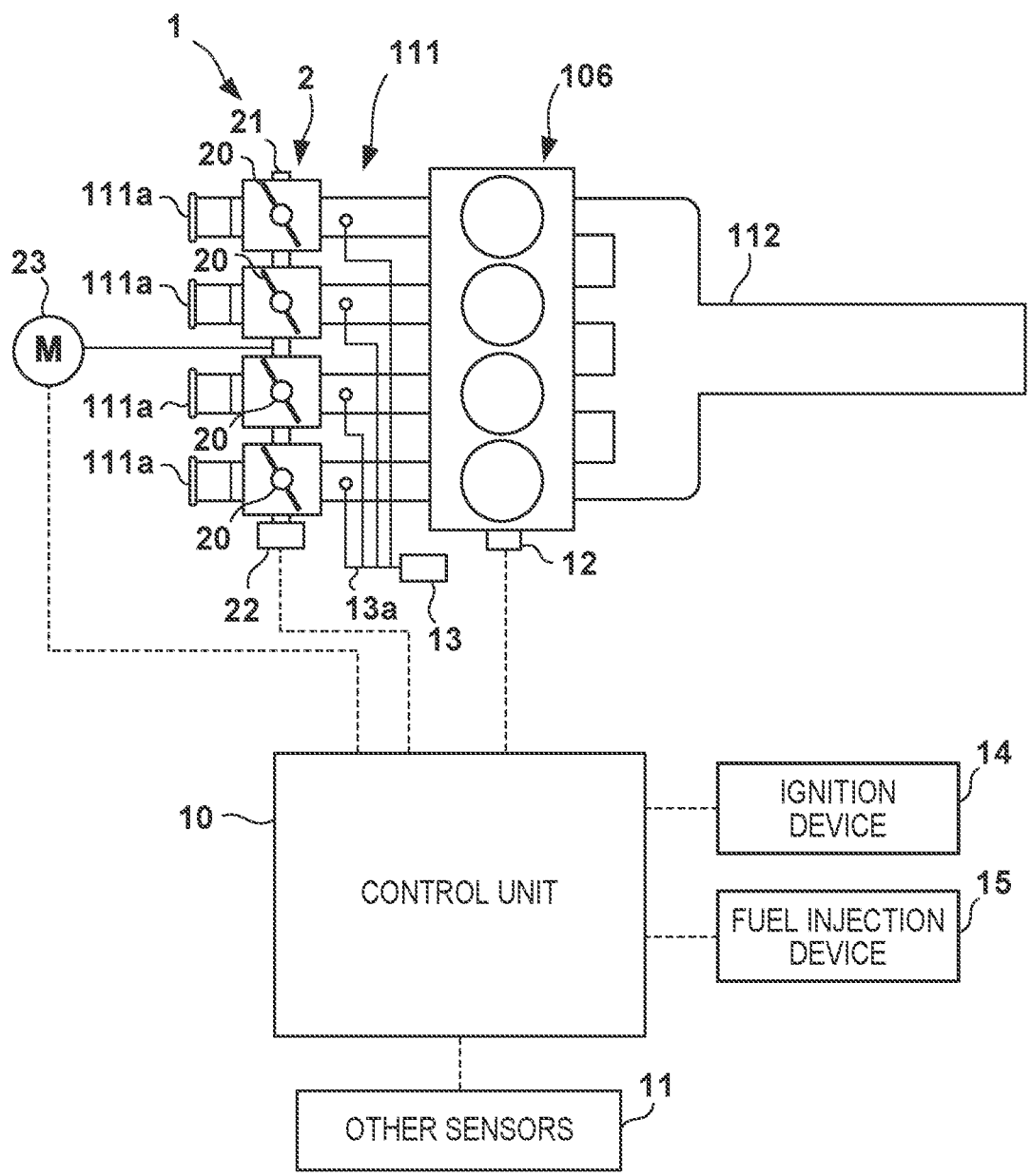
FIG. 2 is a block diagram of the control apparatus according to an embodiment of the present invention.

FIG. 2 is a block diagram of the control apparatus 1 of the internal combustion engine 106. The control apparatus 1 also functions as the abnormality detection device for an intake pressure sensor 13. The intake passage 111 includes the air funnel 111a provided for each cylinder, and an electronically controlled type throttle 2 is provided in the intake passage 111. The throttle 2 includes a throttle valve (a butterfly valve in this embodiment) 20 for each cylinder, and adjusts the amount of air flowing into each combustion chamber of the internal combustion engine 106 by the opening of the throttle valve 20. The throttle valves 20 are supported by one common throttle shaft 21.

The throttle shaft 21 is made to pivot by an actuator 23, and the opening of each throttle valve 20 is thus changed. In this embodiment, the actuator 23 is a motor. The throttle opening of the throttle valve 20 is detected by a throttle opening sensor 22 that detects the rotation amount of the throttle shaft 21. The throttle opening sensor 22 is, for example, a rotary encoder.

The rotation of the crank shaft of the internal combustion engine 106 is detected by a crank angle sensor 12. The crank angle sensor 12 is, for example, a magnetic sensor. A rotor including, on the outer peripheral surface, a plurality of detection target portions (for example, projections) provided in the circumferential direction at a predetermined angular interval is attached to the crank shaft. The crank angle sensor 12 detects each detection target portion and outputs, as a detection signal, a pulse signal that is a pulse train for each predetermined rotation amount. By counting the number of pulses, the phase (rotation angle) of a crank shaft 106a can be specified.

The intake pressure sensor 13 detects the intake pressure of the internal combustion engine 106. In this embodiment, one intake pressure sensor 13 is shared by the plurality of cylinders and, more particularly, shared by all the four cylinders. The intake pressure sensor 13 communicates with the intake passage of each cylinder via a branch pipe 13a. The branch pipe 13a is a collecting pipe in which the pipes of the cylinders are collected into one pipe.

Other sensors 11 include a sensor that detects an operation (accelerator opening) on the accelerator grip 102c, a cam angle sensor, a vehicle speed sensor, an inertial sensor, and the like.

An ignition device 14 includes an ignition plug for each cylinder, and an electric circuit configured to supply high-voltage power to the ignition plug, and produces a spark in the combustion chamber for each cylinder to ignite an air-fuel mixture. A fuel injection device 15 is provided for each cylinder and supplies a fuel to the cylinder.

The control apparatus 1 includes a control unit (ECU) 10. The control unit 10 includes a processor represented by a CPU, a storage device such as a semiconductor memory, an input/output interface to an external device, a driving circuit for the actuator 23, and the like. The storage device stores programs to be executed by the processor and data to be used by the processor for processing. Based on the detection results of the accelerator opening sensor 22, the intake pressure sensor 13, the crank angle sensor 12, and the other sensors 11, the control unit 10 controls the actuator 23 (controls the openings of the throttle valves 20), and controls the ignition device 14 and the fuel injection device 15.

<Abnormality Detection for Intake Pressure Sensor>

An abnormality detection method for the intake pressure sensor 13 will be described. The pressure (intake pressure) in the intake passage pulsates in accordance with a stroke during one cycle of the internal combustion engine 106. That is, the intake pressure lowers (becomes a negative pressure) in an intake stroke or from the end of an exhaust stroke to the intake stroke (valve overlap) when an intake valve is opened, and rises (becomes close to the atmospheric pressure) after the intake stroke when the intake valve is closed.

Figure 3A:
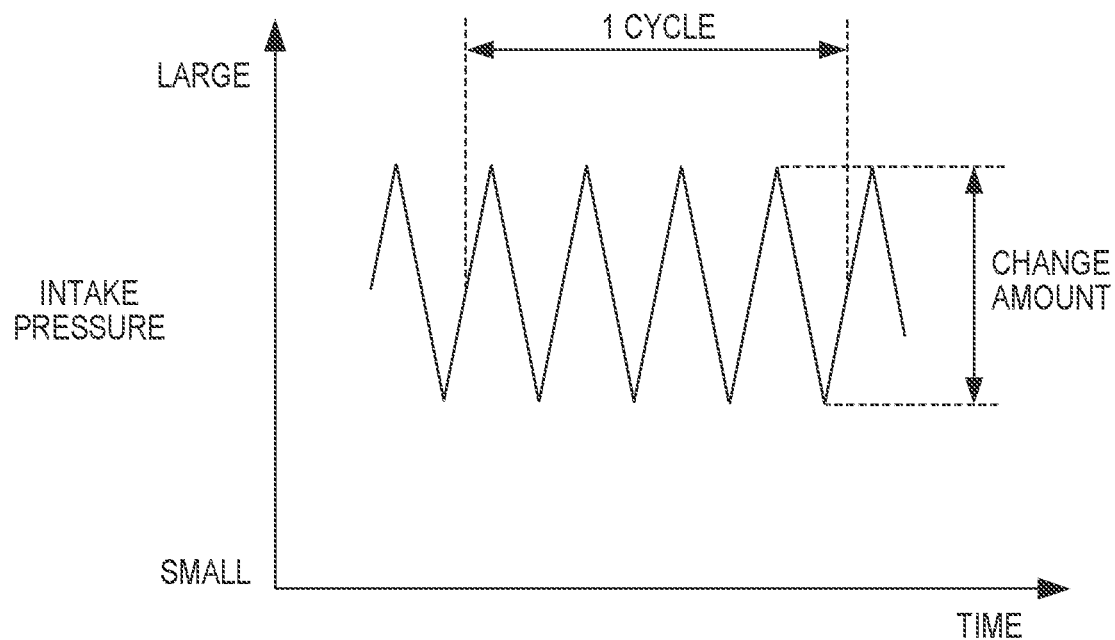
FIG. 3A is a view showing an example of the detection result of an intake pressure in a normal state.
Figure 3B:
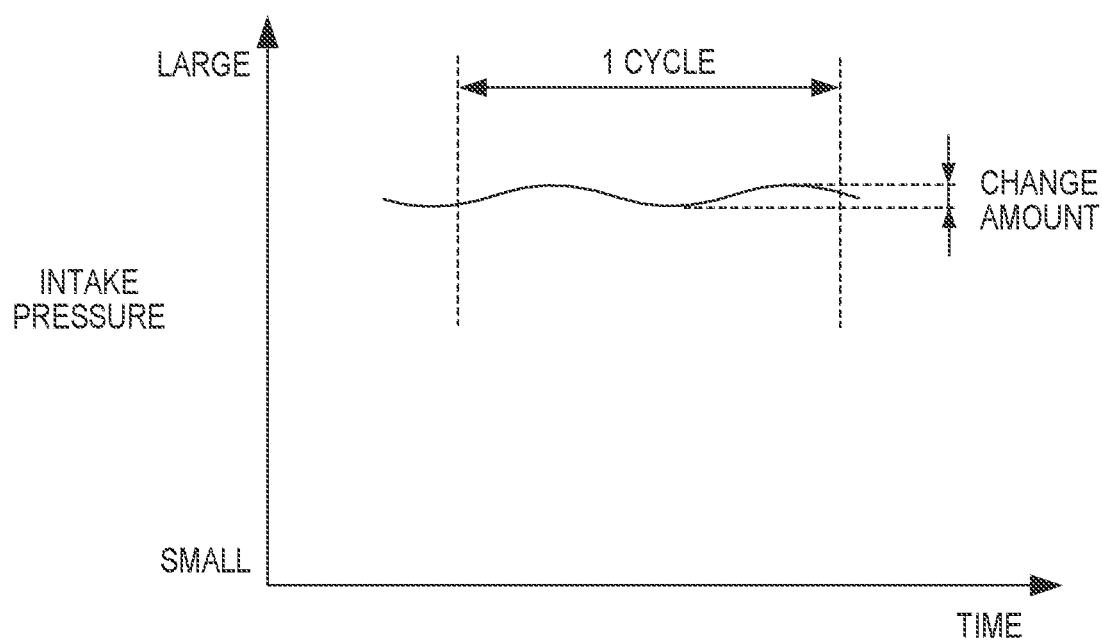
FIG. 3B is a view showing an example of the detection result of the intake pressure in an abnormal state.

FIG. 3A schematically shows an examples of the detection result in a case in which the intake pressure sensor 13 is normal. Since the internal combustion engine 106 is a four-cylinder engine, the intake pressure repeats lowering and rise four times during one cycle of the internal combustion engine 106. If a failure occurs in the intake pressure sensor 13, for example, the detection result exhibits a flat waveform, as shown in FIG. 3B. Hence, the failure of the intake pressure sensor 13 can be detected based on the change amount of the detection result of the intake pressure sensor 13 in one cycle. Note that in this embodiment, the change amount in one cycle is the difference between the minimum value (minimum pressure) and the maximum value (maximum pressure) of the detection result of the intake pressure in one cycle, and is substantially the amplitude of the pulsation of the intake pressure.

Figure 4:
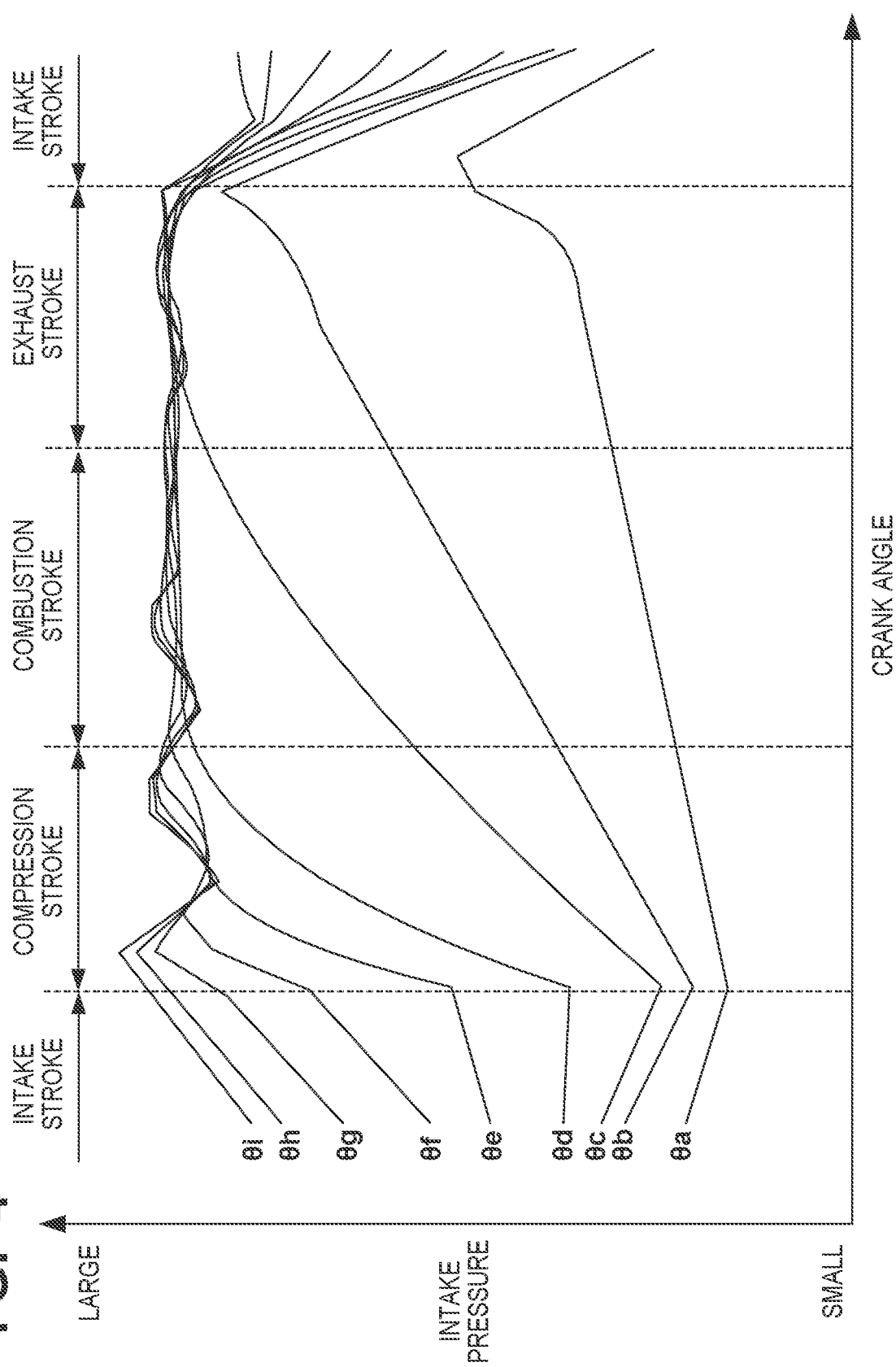
FIG. 4 is a view showing examples of a throttle opening difference and a change of an intake pressure.

On the other hand, the magnitude of the change amount of the intake pressure in one cycle changes depending on the throttle opening. FIG. 4 is an explanatory view showing an example of the change of the intake pressure in the intake passage of one cylinder during one cycle and schematically shows an example of the change of the intake pressure for each different throttle opening. θa to θi represent throttle openings, and the magnitude relationship is given by θa<θb<θc<θd<θe<θf<θg<θh<θi. θa is close to the full close position, and θi is close to the full open position. Note that in this example, the valve opening timing of the intake valve is the end of the exhaust stroke (valve overlap).

As shown in FIG. 4, in a region where the throttle opening is close to the full close position, or in a region where the throttle opening is close to the full open position, the width of the pulsation of the intake pressure is small, and the change amount of the intake pressure in one cycle is small. Hence, if only the change amount of the intake pressure in one cycle is used as a reference, a detection error may occur when determining whether an abnormality has occurred in the intake pressure sensor. In particular, if the intake pressure sensor 13 is shared by a plurality of cylinders, as in this embodiment, the amplitude of the pulsation of the intake pressure that is the detection result becomes small as compared to an arrangement in which the intake pressure sensor 13 is provided for each cylinder. Hence, the possibility of a detection error becomes higher.

Figure 5:
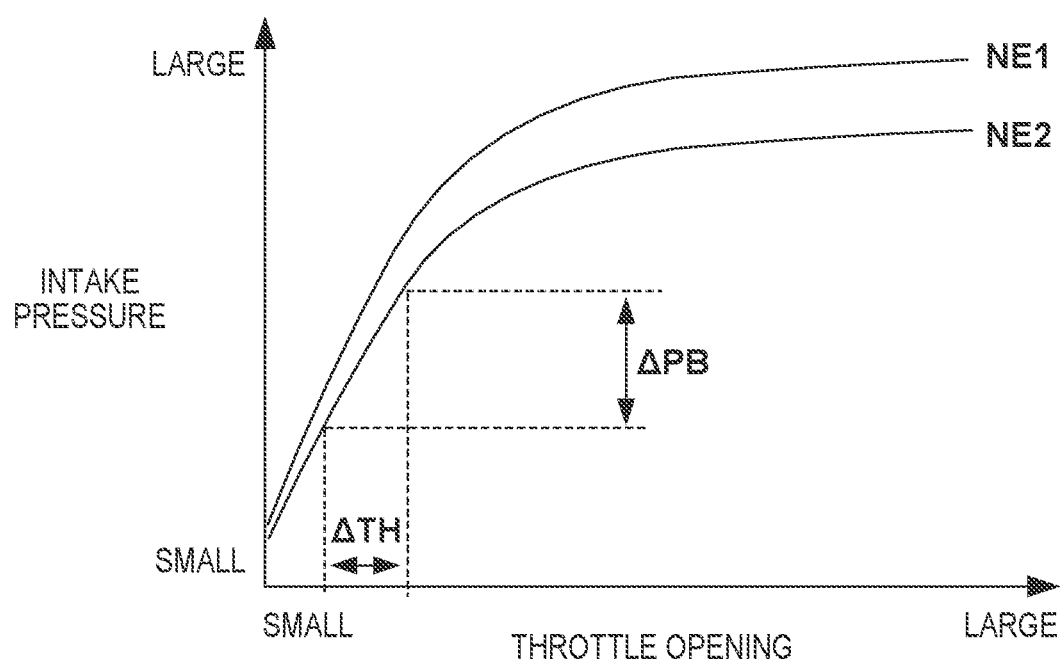
FIG. 5 is a view showing the relationship between the throttle opening and the intake pressure.

On the other hand, if the throttle opening changes, the intake pressure changes. FIG. 5 is a schematic view showing an example of the relationship between the throttle opening and the intake pressure. The example of FIG. 5 shows NE1 and NE2 (<NE1) as the rotation speed of the internal combustion engine 106. If the throttle opening becomes large (the throttle is opened), the intake pressure becomes large (becomes close to the atmospheric pressure). If the intake pressure sensor 13 is normal, it is possible to detect that the intake pressure changes only by APB in accordance with a change ΔTH of the throttle opening, as shown in FIG. 5. Conversely, if the intake pressure sensor 13 is abnormal, the intake pressure does not change by APB even if the throttle opening changes only by ΔTH.

Hence, in addition to the change amount of the intake pressure in one cycle, intake pressures detected by the intake pressure sensor 13 are compared between different throttle openings, thereby accurately determining whether the intake pressure sensor 13 is normal or abnormal.

Figure 6:
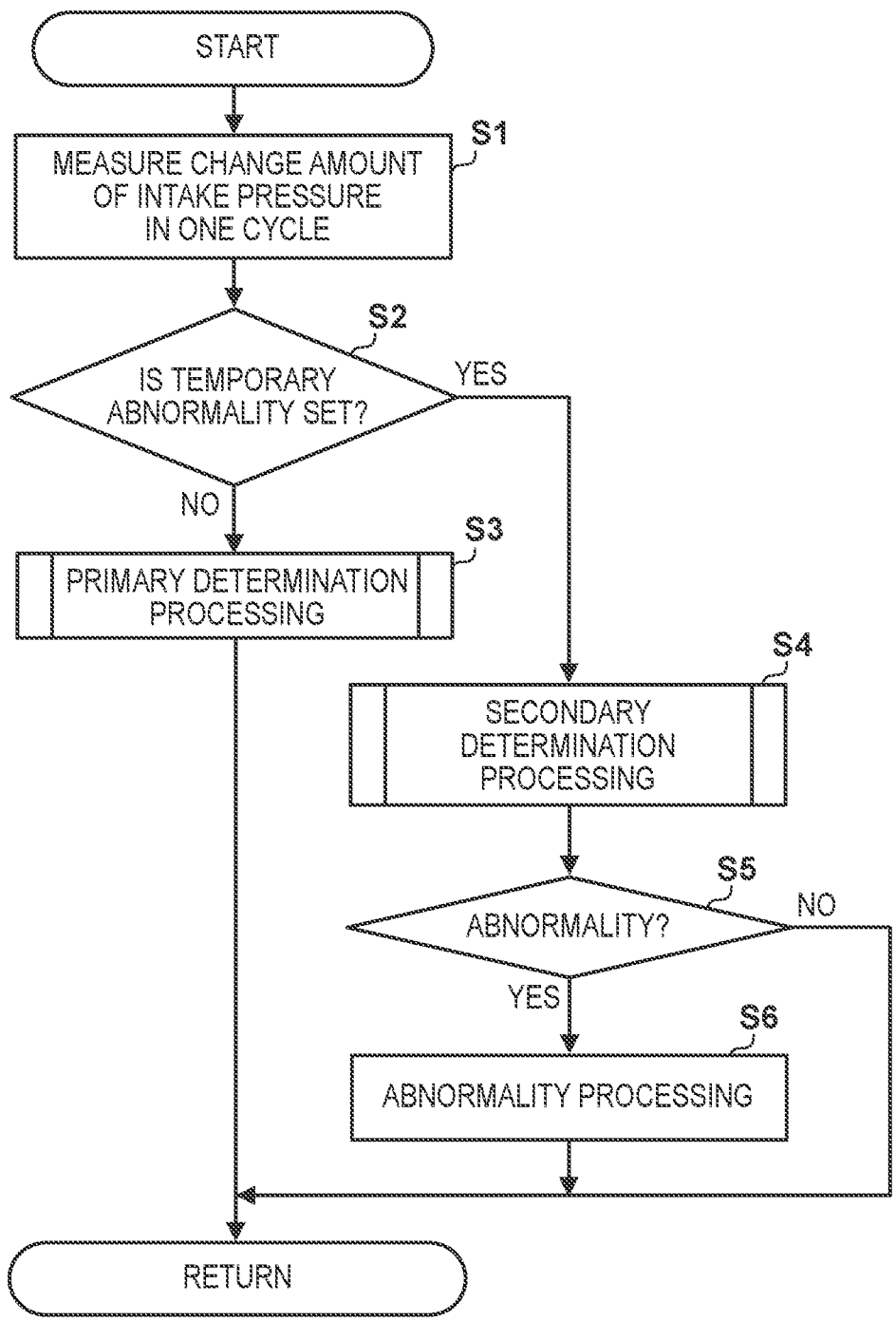
FIG. 6 is a flowchart showing an example of processing of the control apparatus shown in FIG. 2.

FIG. 6 is a flowchart showing an example of processing executed by the control unit 10 and, more particularly, a flowchart showing an example of abnormality detection device processing for the intake pressure sensor 13. The control unit 10 repetitively executes the processing shown in FIG. 6.

In step S1, the change amount of the intake pressure in one cycle of the internal combustion engine 106 is measured based on the detection result of the intake pressure sensor 13. For example, the detection result of the intake pressure sensor 13 is acquired for every predetermined angle of the crank shaft, and the minimum value and the maximum value are sequentially updated. The minimum value and the maximum value at the end of one cycle (0° to 720° in terms of crank angle) are obtained as the minimum value and the maximum value of the intake pressure in that cycle, and the difference between these is obtained as the change amount. The measurement results (a minimum value PBmin, a maximum value PBmax, and a change amount PBdef) are stored in the storage device of the control unit 10.

In step S2, it is determined whether a temporary abnormality is set. If a temporary abnormality is set, the process advances to step S4. If a temporary abnormality is not set, the process advances to step S3. A temporary abnormality is set if it is determined, by the primary determination processing in step S3, that the intake pressure sensor 13 is abnormal. In the primary determination processing of step S3, it is determined, based on the change amount of the intake pressure in one cycle, whether the intake pressure sensor 13 is abnormal. Details will be described later.

In step S4, secondary determination processing is executed. In the secondary determination processing, intake pressures are compared between different throttle openings, thereby accurately determining whether the intake pressure sensor 13 is abnormal. In an operation region where the width of the pulsation of the intake pressure is small, the accuracy of abnormality detection can be improved. Details will be described later.

In step S5, it is determined whether the determination result of step S4 indicates the abnormality of the intake pressure sensor 13. It is determined, by the two steps of primary determination processing (step S3) and secondary determination processing (step S4), whether the intake pressure sensor 13 is abnormal, thereby accurately detecting the abnormality of the intake pressure sensor 13. If the determination result of step S4 indicates an abnormality, the abnormality of the intake pressure sensor 13 is decided, and the process advances to step S6. In step S6, abnormality processing is performed. In the abnormality processing, for example, processing such as a notification to the rider or change of operation control of the internal combustion engine 106 is performed.

Figure 7:
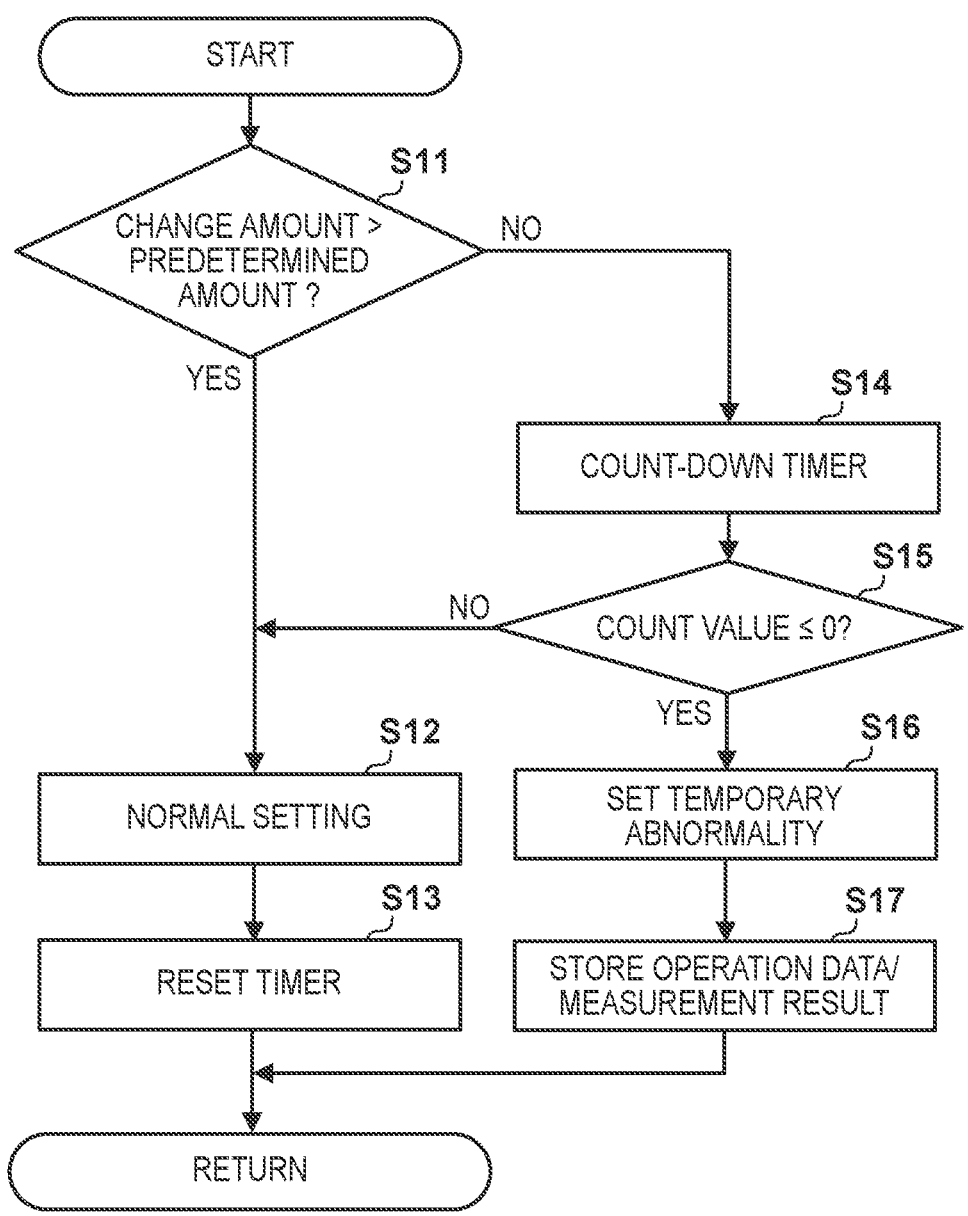
FIG. 7 is a flowchart showing an example of processing of the control apparatus shown in FIG. 2.

FIG. 7 is a flowchart showing the primary determination processing in step S3. In step S11, it is determined whether the change amount PBdef measured in step S1 exceeds a predetermined amount (threshold). If the change amount PBdef exceeds the predetermined amount, the intake pressure sensor 13 is regarded as normal, and the process advances to step S12 to do a setting to show the normal state. Setting contents associated with the abnormality of the intake pressure sensor 13 are stored in a predetermined storage area of the storage device of the control unit 10. In step S13, a timer for temporary abnormality determination is set (an initial value is set).

If the change amount measured in step S1 is equal to or smaller than the predetermined amount, the process advances to step S14. In step S14, the timer for temporary abnormality determination is decremented. In step S15, it is determined whether the count value of the timer is 0 or less. If the count value is 0 or less, it is regarded that there is a possibility that the intake pressure sensor 13 is abnormal, and the process advances to step S16. If the count value is not 0 or less, the process advances to step S13. In step S16, a setting to show that the intake pressure sensor 13 is abnormal is performed. As described above, in this embodiment, instead of immediately setting a temporary abnormality once the change amount measured in step S1 exceeds the predetermined amount, a temporary abnormality is set when the change amount exceeds the predetermined amount continuously for a predetermined time using the timer. The predetermined time is, for example, a time from 2 to 5 sec.

In step S17, the measurement result and the data of the operation state of the internal combustion engine 106 at the time of change amount measurement (step S1) are stored in a predetermined storage area of the storage device of the control unit 10. In this embodiment, the stored data of the operation state includes a throttle opening and a rotation speed, and these are derived from the detection results of the throttle opening sensor 22 and the crank angle sensor 12. In the following description, the throttle opening and the rotation speed to be stored are defined as THer and NEer, respectively. In addition, the stored data of the measurement result includes the minimum value PBmin and the maximum value PBmax, which will be defined as PBermin and PBermax in the following description.

Figure 8:
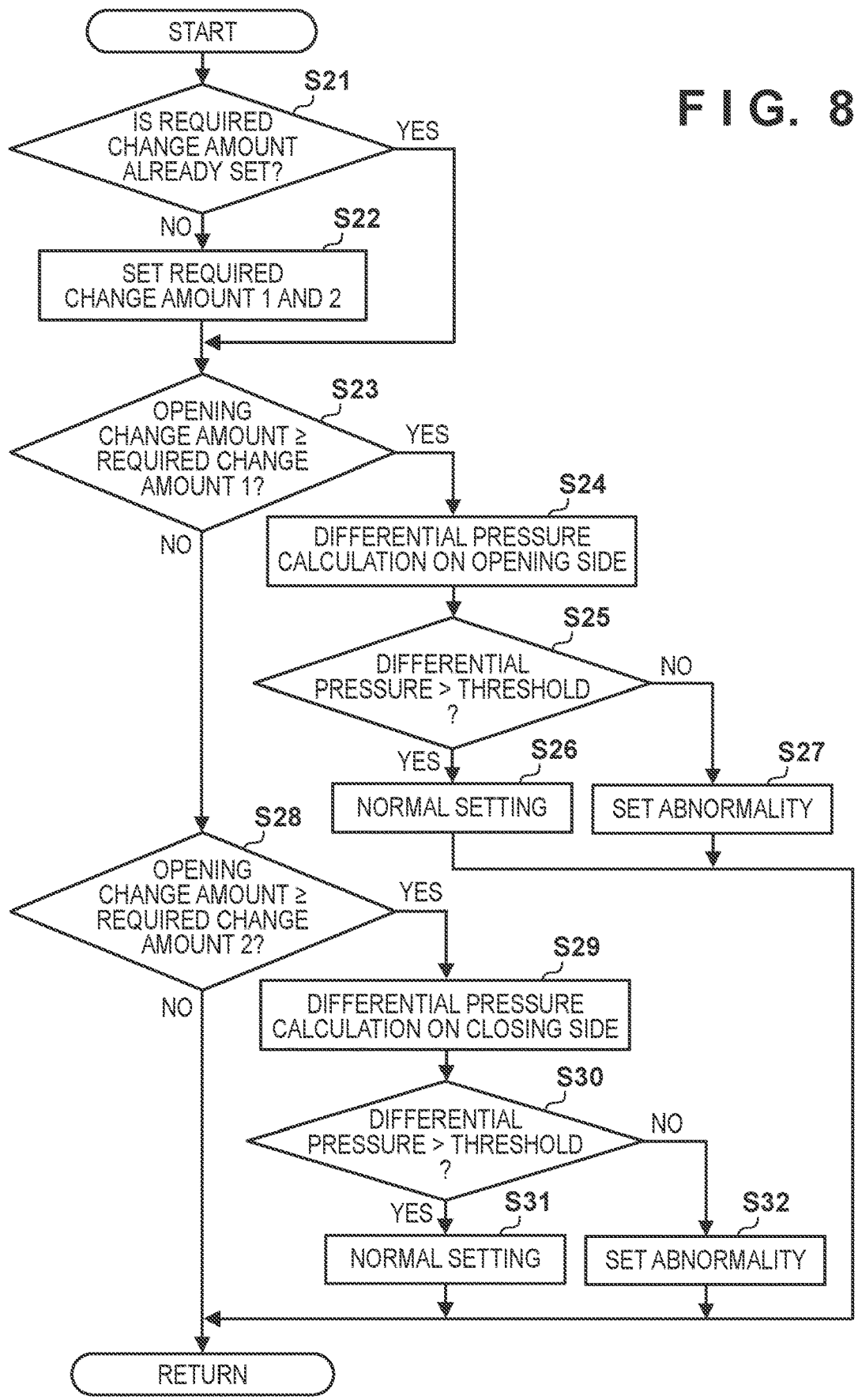
FIG. 8 is a flowchart showing an example of processing of the control apparatus shown in FIG. 2.

FIG. 8 is a flowchart showing the secondary determination processing in step S4. In this embodiment, the measurement result in step S1 when a temporary abnormality is set and the measurement result in step S1 measured after that in a different throttle opening state are compared, thereby determining whether the intake pressure sensor 13 is abnormal.

In step S21, it is determined whether a required change amount is already set. If a required change amount is already set, the process advances to step S23. If a required change amount is set yet, the process advances to step S22. The required change amount is the threshold of the opening difference (ΔTH in FIG. 5) between different throttle openings, between which the detection results of intake pressures are compared. If the opening difference is small, even if the intake pressure sensor 13 is normal, the difference (APB in FIG. 5) between the intake pressures that are the detection results is small. For this reason, there is a possibility that the abnormality determination accuracy lowers. Also, in a region where the opening difference is not small, but the opening is large, the intake pressure difference is small, as shown in FIG. 5. For this reason, there is a possibility that the abnormality determination accuracy lowers. The relationship between the throttle opening and the intake pressure also depends on the rotation speed of the internal combustion engine 106 (NE1 and NE2 in FIG. 5.

In this embodiment, a required change amount is set dynamically in accordance with the operation state of the internal combustion engine 106. In step S22, a required change amount 1 and a required change amount 2 are set. The required change amount 1 is the threshold of the opening difference used in a case in which the opening is larger after the change of the throttle opening than before the change (in a case in which the throttle is opened). The required change amount 2 is the threshold of the opening difference used in a case in which the opening is smaller after the change of the throttle opening than before the change (in a case in which the throttle is closed).

The required change amounts 1 and 2 are set based on the data of the operation state stored in step S14 and a setting map stored in advance in the storage device of the control unit 10. The setting map is created by experiments or simulations in advance.

As the required change amounts 1 and 2, for example, referring to FIG. 5, if the throttle opening THer stored in step S14 is large, a relatively large opening difference is set. To the contrary, if the throttle opening THer stored in step S14 is small or medium, a relatively small opening difference is set. Also, as shown in FIG. 5, the higher the rotation speed of the internal combustion engine 106 is, the wider the range of the intake pressure with respect to the throttle opening is. The lower the rotation speed is, the narrower the range is. Hence, if the rotation speed NEer stored in step S14 is high, a relatively small opening difference is set. If the rotation speed NEer is low, a relatively large opening difference is set.

The required change amount is discriminated between the required change amount 1 on the opening side and the required change amount 2 on the closing side because, as is apparent from FIG. 5, even if the opening difference is the same, the intake pressure difference changes between a case in which the throttle opening becomes large from a given opening and a case in which the throttle opening becomes small from a given opening. For example, if the throttle opening changes from a large state to a larger state, the intake pressure difference is small unless a relatively large opening difference is set, and it is disadvantageous in determining an abnormality. To the contrary, if the throttle opening changes from a large state to a smaller state, the intake pressure difference is large, and it may be sufficient for abnormality determination even if the opening difference is relatively small.

In step S23, it is determined whether the current throttle opening acquired from the throttle opening sensor 22 has changed to the opening side by an amount equal to or larger than the required change amount 1 with respect to the throttle opening stored in step S14. Letting THn be the current throttle opening, this is given by $$THn-THer \geq \text{required change amount 1}$$

and, it is determined whether the expression is satisfied. If the expression is satisfied, the process advances to step S24. Otherwise, the process advances to step S28.

In step S28, it is determined whether the current throttle opening acquired from the throttle opening sensor 22 has changed to the closing side by an amount equal to or larger than the required change amount 2 with respect to the throttle opening stored in step S14. This is given by $$THer-THn \geq \text{required change amount 2}$$

and, it is determined whether the expression is satisfied. If the expression is satisfied, the process advances to step S29. Otherwise, the current throttle opening is not the comparison target, and the processing is ended.

In step S24, the differential pressure between the detection results of intake pressures for different throttle openings is calculated. The differential pressure calculation here is differential pressure calculation on the opening side with respect to the throttle opening THn after the change, which has changed in the opening direction from the throttle opening THer before the change. As the detection results of intake pressures to be compared, PBermin or PBermax when the throttle opening is the throttle opening THer and PBmin and PBmax measured in step S1 this time in correspondence with the throttle opening THn can be used. In this embodiment, in the differential pressure determination on the opening side, the minimum value PBermin before the throttle opening change and the maximum value PBmax after the throttle opening change are used. PBermin and PBmin may be compared, or PBermax and PBmax may be compared. However, since the differential pressure becomes larger, comparison between PBermin and PBmax is advantageous.

In step S25, it is determined whether the differential pressure calculated in step S24 exceeds a threshold. This is given by $$PBmax-PBermin > \text{threshold}$$

and, it is determined whether the expression is satisfied. If the expression is satisfied, the intake pressure sensor 13 is regarded as normal, and a setting to show the normal state is done in step S26. If the expression is not satisfied, the intake pressure sensor 13 is decided as abnormal, and a setting to show the abnormal state is done in step S27.

In step S29, the differential pressure between the detection results of intake pressures for different throttle openings is calculated. The differential pressure calculation here is differential pressure calculation on the closing side with respect to the throttle opening THn after the change, which has changed in the closing direction from the throttle opening THer before the change. As the detection results of intake pressures to be compared, PBermin or PBermax when the throttle opening is the throttle opening THer and PBmin and PBmax measured in step S1 this time in correspondence with the throttle opening THn can be used. In this embodiment, in the differential pressure determination on the closing side, the maximum value PBermax before the throttle opening change and the minimum value PBmin after the throttle opening change are used. PBermin and PBmin may be compared, or PBermax and PBmax may be compared. However, since the differential pressure becomes larger, comparison between PBermax and PBmin is advantageous.

In step S30, it is determined whether the differential pressure calculated in step S29 exceeds a threshold. This is given by $$PBermax-PBmin > \text{threshold}$$

and, it is determined whether the expression is satisfied. If the expression is satisfied, the intake pressure sensor 13 is regarded as normal, and a setting to show the normal state is done in step S31. If the expression is not satisfied, the intake pressure sensor 13 is decided as abnormal, and a setting to show the abnormal state is done in step S32.

Note that the threshold in step S25 and the threshold in step S30 may be the same or different. Both the thresholds are set in advance by experiments or simulations in advance together with the setting map that determines the required change amounts 1 and 2.

Second Embodiment

Figure 9A:
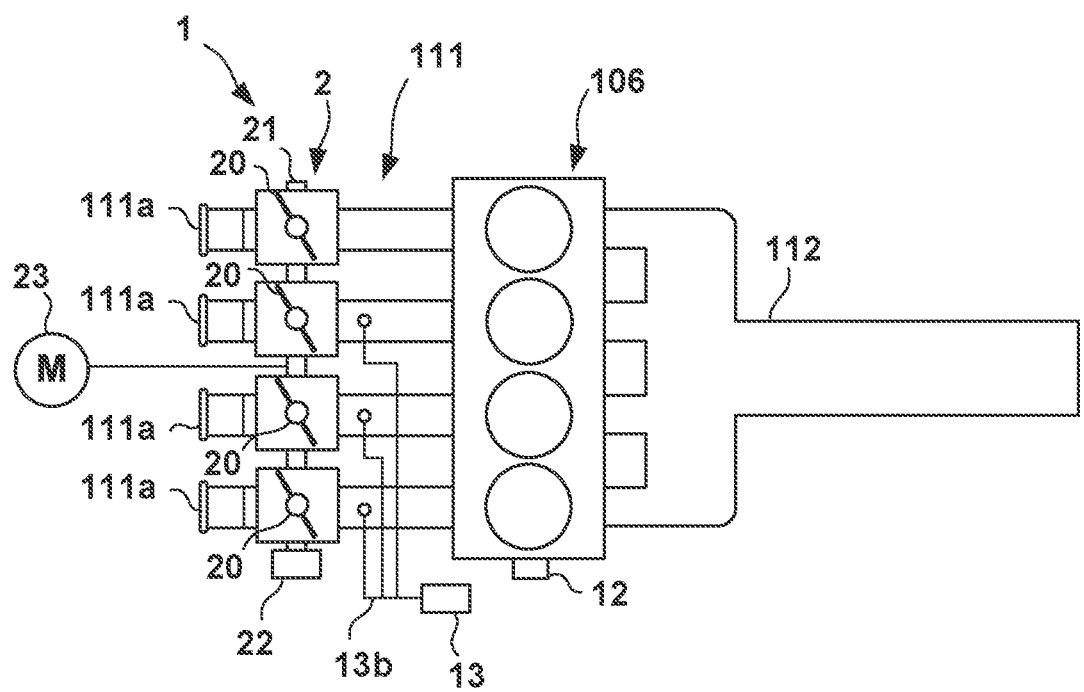
FIGS. 9A and 9B are views showing other examples of an intake pressure stricture.

In the first embodiment, the intake pressure sensor 13 communicates with the intake passages of all cylinders. However, the intake pressure sensor may communicate with the intake passages of some cylinders. FIG. 9A shows an example. In the example shown in FIG. 9A, three cylinders and an intake pressure sensor 13 communicate via a branch pipe 13b. As another example, the intake pressure sensor 13 may communicate with one cylinder.

Figure 9B:
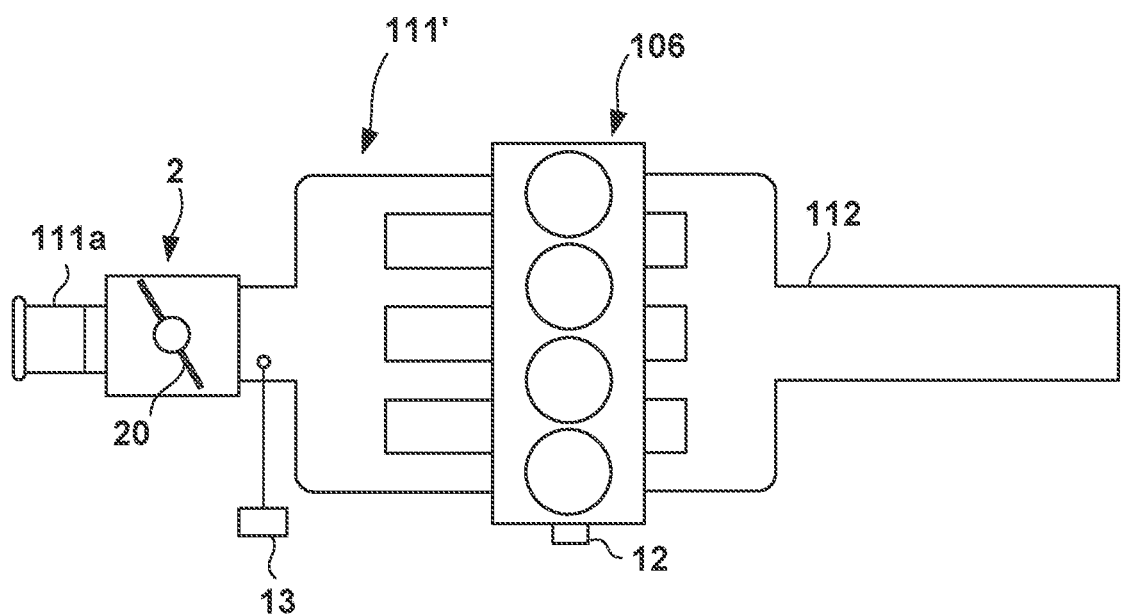

In the first embodiment, the intake passage is defined for each cylinder. However, a collecting pipe may be used. FIG. 9B is a view showing an example. In an intake passage 111' shown in FIG. 9B, one air funnel 111a is provided commonly for four cylinders, and a throttle 2 includes one throttle valve 20 for the four cylinders. On the downstream side of the intake passage 111', the intake passage branches for each cylinder and has a form of a collecting pipe. One intake pressure sensor 13 is provided to detect the intake pressure of the collecting pipe.

In the first embodiment and the examples shown in FIGS. 9A and 9B, an internal combustion engine including parallel four cylinders is shown. However, the number of cylinders and the cylinder arrangement are not limited to these. For example, an internal combustion engine with a single cylinder may be used.

OTHER EMBODIMENTS

In the first embodiment, in the secondary determination processing of step S4, the detection result of the intake pressure sensor 13 at the time of a temporary abnormality is used as the detection result before the change of the throttle opening. However, the present invention is not limited to this. The detection results of intake pressures between different throttle openings, which are compared in the secondary determination processing of step S4, need only be detection results after the temporary abnormality is set, and the detection result of the intake pressure sensor 13 at the time of the temporary abnormality need not be used. In this case, setting of the required change amounts 1 and 2 in step S22 is done based on the operation state of the internal combustion engine 106 before the change of the throttle opening.

Also, in the first embodiment, as the operation state used to set the required change amounts 1 and 2 in step S22, the throttle opening and the rotation speed of the internal combustion engine 106 have been exemplified. However, configuration may be such that only the throttle opening is used.

Additionally, in the first embodiment, two steps of determination, that is, the primary determination processing of step S3 and the secondary determination processing of step S4 are performed. However, configuration may be such that the abnormality detection for the intake pressure sensor 13 is done only by the secondary determination processing of step S4.

SUMMARY OF EMBODIMENTS

The above-described embodiments disclose at least the following abnormality detection device.
1. According to the above-described embodiment, there is provided an abnormality detection device (1) comprising:
an intake pressure sensor (13) configured to detect an intake pressure of an internal combustion engine (106);
an opening sensor (22) configured to detect a throttle opening of the internal combustion engine (106); and
a determination unit (10) configured to determine, based on detection results of the intake pressure sensor (13) and the opening sensor (22), whether the intake pressure sensor (13) is abnormal,
wherein the determination unit (10) determines, based on a result of intake pressure comparison between different throttle openings, whether the intake pressure sensor is abnormal (S3, S4).

According to this embodiment, the abnormality of the intake pressure sensor is determined based on the result of comparison of the intake pressure between different throttle openings, thereby improving the accuracy of abnormality detection in a driving region in which the width of the pulsation of the intake pressure is small.

2. In the above-described embodiment,
the determination unit (10) determines, based a change amount of the intake pressure in one cycle and the result of the intake pressure comparison between the different throttle openings, whether intake pressure sensor is abnormal (S3, S4).

According to this embodiment, the abnormality of the intake pressure sensor is determined based on the two factors, that is, the change amount of the intake pressure in one cycle and the result of comparison of the intake pressure between the different throttle openings, thereby improving the accuracy of abnormality detection.

3. In the above-described embodiment,
if the change amount of the intake pressure in one cycle exceeds a predetermined amount, the determination unit (10) determines that the intake pressure sensor is not abnormal (S11, S12), and
if the change amount of the intake pressure in one cycle is not more than the predetermined amount, the determination unit determines, based on the result of the intake pressure comparison between the different throttle openings, whether the intake pressure sensor is abnormal (S2, S4).

According to this embodiment, if there is the possibility of the abnormality of the intake pressure sensor based on the change amount of the intake pressure in one cycle, comparison of the intake pressure between the different throttle openings is performed. If the intake pressure sensor is normal, comparison of the intake pressure between the different throttle openings is not performed. Hence, the processing load can be reduced.

4. In the above-described embodiment,
an opening difference between the different throttle openings is set in accordance with an operation state of the internal combustion engine in the throttle opening before a change (S22).

According to this embodiment, the opening difference is dynamically set, thereby performing appropriate comparison.

5. In the above-described embodiment,
the operation state includes the throttle opening and a rotation speed of the internal combustion engine.

According to this embodiment, the opening difference is dynamically set based on the throttle opening and the rotation speed of the internal combustion engine, which influence the variation of the intake pressure, thereby performing appropriate comparison.

6. In the above-described embodiment,
in the comparison, a minimum pressure of the intake pressure in one cycle for one throttle opening and a maximum pressure of the intake pressure in one cycle for the other throttle opening are compared (S24, S29).

According to this embodiment, the differential pressure can be set large, and comparison of the intake pressure between different throttle openings is facilitated.

7. In the above-described embodiment,
in the comparison,
if the throttle opening changes in an opening direction, a minimum pressure of the intake pressure in one cycle for the throttle opening before a change and a maximum pressure of the intake pressure in one cycle for the throttle opening after the change are compared (S24), and
if the throttle opening changes in a closing direction, a maximum pressure of the intake pressure in one cycle for the throttle opening before the change and a minimum pressure of the intake pressure in one cycle for the throttle opening after the change are compared (S29).

According to this embodiment, the differential pressure can be set large, and comparison of the intake pressure between different throttle openings is facilitated.

8. In the above-described embodiment,
the internal combustion engine is a multi-cylinder internal combustion engine, and
the intake pressure sensor (13) is shared by a plurality of cylinders.

According to this embodiment, it is possible to improve the accuracy of abnormality detection while decreasing the number of intake pressure sensors.

The invention is not limited to the foregoing embodiments, and various variations/changes are possible within the spirit of the invention.

What is claimed is:

1. An abnormality detection device comprising:
an intake pressure sensor configured to detect an intake pressure of an internal combustion engine;
an opening sensor configured to detect a throttle opening of the internal combustion engine; and
a determination unit configured to determine, based on detection results of the intake pressure sensor and the opening sensor, whether the intake pressure sensor is abnormal,
wherein:
if the change amount of the intake pressure in one cycle exceeds a predetermined amount, the determination unit determines that the intake pressure sensor is not abnormal,
if the change amount of the intake pressure in one cycle is not more than the predetermined amount, the determination unit determines, based on the result of the intake pressure comparison between the different throttle openings, whether the intake pressure sensor is abnormal, and
an opening difference between the different throttle openings is set in accordance with an operation state of the internal combustion engine in the throttle opening before a change.

2. The device according to claim 1, wherein the operation state includes the throttle opening and a rotation speed of the internal combustion engine.

3. The device according to claim 2, wherein in the comparison, a minimum pressure of the intake pressure in one cycle for one throttle opening and a maximum pressure of the intake pressure in one cycle for the other throttle opening are compared.

4. The device according to claim 2, wherein in the comparison,
if the throttle opening changes in an opening direction, a minimum pressure of the intake pressure in one cycle for the throttle opening before a change and a maximum pressure of the intake pressure in one cycle for the throttle opening after the change are compared, and
if the throttle opening changes in a closing direction, a maximum pressure of the intake pressure in one cycle for the throttle opening before the change and a minimum pressure of the intake pressure in one cycle for the throttle opening after the change are compared.

5. The device according to claim 1, wherein the internal combustion engine is a multi-cylinder internal combustion engine, and
the intake pressure sensor is shared by a plurality of cylinders.

* * * * *